United States Patent [19]
Hayashida

[11] 3,849,770
[45] Nov. 19, 1974

[54] DEVICE FOR DETECTING DECREASE OF LIQUID IN A LIQUID RESERVOIR

[75] Inventor: Yoshihiro Hayashida, Chigasaki, Japan

[73] Assignee: Tokico Ltd., Kawasaki, Kanagawa-ken, Japan

[22] Filed: Apr. 24, 1973

[21] Appl. No.: 354,003

[30] Foreign Application Priority Data
Apr. 25, 1972   Japan.............................. 47-49285

[52] U.S. Cl. .............. 340/244 E, 200/84 C, 340/59
[51] Int. Cl. ............................................ G08b 21/00
[58] Field of Search.............. 340/244, 59; 200/84 C

[56] References Cited
UNITED STATES PATENTS

| | | | |
|---|---|---|---|
| 3,478,184 | 11/1969 | Cofoid | 200/84 C |
| 3,560,918 | 2/1971 | Lewis et al | 340/59 |
| 3,678,490 | 7/1972 | Putt | 340/59 |

FOREIGN PATENTS OR APPLICATIONS

| | | | |
|---|---|---|---|
| 1,518,966 | 2/1967 | France | 200/84 C |

Primary Examiner—John W. Caldwell
Assistant Examiner—Daniel Myer
Attorney, Agent, or Firm—Waters, Roditi, Schwartz & Nissen

[57] ABSTRACT

A device for detecting decrease of liquid comprising a permanent magnet having vertically disposed poles which moves downwardly with decrease of the liquid in a liquid reservoir, a reed switch disposed horizontally in the reservoir and closed by lines of magnetic force of the permanent magnet when the permanent magnet moves down to a position of predetermined height and an alarm means actuated by closing of the reed switch.

5 Claims, 8 Drawing Figures

DEVICE FOR DETECTING DECREASE OF LIQUID IN A LIQUID RESERVOIR

BACKGROUND OF THE INVENTION

This invention relates to a device for detecting decrease of liquid in a liquid reservoir and, more particularly, to a device for detecting decrease of liquid below a predetermined level in a liquid reservoir which communicates with a master cylinder of an automobile.

For detecting decrease of liquid level below a predetermined level in an oil reservoir communicating with a master cylinder of an automobile, a device has been proposed which comprises a magnet provided on a float floating on the liquid or on a bellows, and a reed switch closed by the magnet.

This type of detection device includes a cylindrical portion provided at the center of a cap of an oil reservoir and projecting downwardly therefrom, a reed switch disposed in the cylindrical portion and an annular permanent magnet secured to a float floating on the oil stored in the oil reservoir and enclosing the cylindrical portion.

According to this device of the prior art, the cylindrical portion, reed switch, float and magnet all have to be taken out of the oil reservoir in order to remove the cap for replenishing the oil reservoir with oil. As the cylindrical portion, float, etc., are being taken out, oil drips from these elements and stains the mounting portion of the oil reservoir. Further, the known device is disadvantageous in that the cylindrical portion and the reed switch tend to be damaged and a lead wire tends to be cut off unless the removal and mounting operations of the device are carried out with minute care and attention. Furthermore, since the reed switch is arranged vertically in the prior art device, the range of selection of the liquid level for operating the reed switch is relatively narrow.

It has also been proposed to arrange a reed switch horizontally in a rectangular oil reservoir and to dispose a magnet in a direction parallel to a longitudinal direction of the reed switch, i.e., horizontally and above the reed switch.

This type of device requires precision in the parallel relation and alignment between the magnet and the reed switch. If this precision is not maintained, the device is incapable of effecting an accurate operation. Further, in the case where the magnet is mounted on a screw type cap covering a cylindrical reservoir which is commonly used in an automobile, the magnet is not necessarily aligned accurately with the reed switch as viewed from above when the cap is acrewed in the reservoir. Accordingly, this device is not suitable for the cylindrical oil reservoir.

SUMMARY OF THE INVENTION

It is an object of the invention to provide a novel and useful device for detecting decrease of liquid in a liquid reservoir in which the above described disadvantages of the prior art devices are eliminated.

Another object of the invention is to provide a device for detecting decrease of liquid which obviates the necessity for taking the reed switch etc., out of a liquid reservoir in removing the cap thereof for replenishing of liquid.

Another object of the invention is to provide a device for detecting decrease of liquid which employs a magnet having vertically arranged poles as the permanent magnet for operating the reed switch so that the reed switch may be operated accurately whatever direction in a horizontal plane the magnet may be disposed.

A further object of the invention is to provide a device for detecting decrease of liquid in which a reed switch is provided in the vicinity of the bottom surface of a liquid reservoir.

A still further object of the invention is to provide a device for detecting decrease of liquid which is provided with a one-way valve capable of admitting air only in a direction in which it enters the inside of the reservoir.

Other objects and features of the invention will become apparent from the description made hereinbelow with reference to the accompanying drawings.

DETAILED DESCRIPTION

Figure 1:
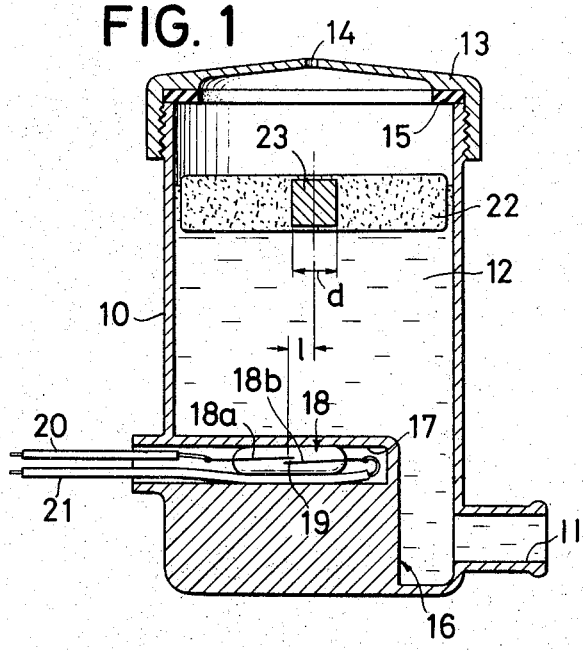
FIG. 1 is a vertical sectional view showing a first embodiment of a device for detecting decrease of liquid according to the invention.

Referring to FIG. 1, therein is seen an oil reservoir 10 generally of a cylindrical configuration and made of a non-magnetic material. The oil reservoir 10 communicates with a master cylinder (not shown) through a conduit 11 and contains oil 12 such as brake oil or clutch oil for automobiles. The reservoir 10 has an upper open end which is covered by a cap 13 which is in threaded engagement with the outer circumferential surface of the upper end portion of the reservoir 10. In the middle of the cap 13 there is formed a vent hole 14. As the cap 13 is screwed on the reservoir 10, a packing 15 serves to provide a sealing engagement between the upper end of the reservoir 10 and the cap 13.

A shoulder portion 16 is provided on the bottom surface of the reservoir 10. The top surface of the shoulder portion 16 is at a higher level than the conduit 11. The shoulder portion 16 is formed in the vicinity of the upper portion thereof with a blind hole 17 extending from the outer circumferential surface in a diametrical direction thereof. A reed switch 18 is inserted in this blind hole 17 at its open end. The normally open end contact portions 19 of reeds 18a, 18b of the reed switch 18 are offset from the center of the reservoir 10 by a distance $l$. Lead wires 20, 21 connected to the reeds 18a, 18b of the reed switch 18 are taken out of the open end of the blind hole 17.

A disc-shaped float 22 made of a foamed plastic, rigid foam rubber or like material floats on the surface of the oil 12 stored in the reservoir 10. The float 22 has an outer diameter which is slightly smaller than the inner diameter of the reservoir 10. A columnar permanent magnet 23 having a diameter $d$ is buried in the middle portion of the float 22 in such a manner that the axis of the permanent magnet is aligned with the axis of the cylindrical reservoir 10. The permanent magnet 23 has its N and S poles dispoed in an axial, namely vertical, direction. The distance $l$ is equivalent to a horizontal distance between the axis of the permanent magnet 23 and the contact portions 19 of the reed switch 18. The position of the reed switch 18 and the diameter $d$ of the permanent magnet 23 are so selected that the distance $l$ becomes equivalent to or slightly larger than the radius $d/2$ of the permanent magnet 23.

If the oil 12 contained in the oil reservoir 10 decreases due to leakage or some other cause, the float 22 descends along the inner wall of the reservoir 10, following the decrease of the liquid level. When the height of the surface of the oil 12 (liquid level) has not decreased to a predetermined liquid level to be detected, a vertical distance $h$ between the lower surface of the permanent magnet 23 and the contact portions 19 of the reed switch 18 is relatively great as will be seen in FIG. 2A. Hence, the force exerted on the reeds 18a, 18b of the reed switch 18 by lines 24 of magnetic flux of the permanent magnet 23 is relatively weak and the resilient force of the reeds 18a and 18b is stronger than the attractive force of the lines of magnetic flux. Therefore, the reeds 18a and 18b remain spaced apart from each other and the reed switch 18 is thus opened.

Figure 2A:
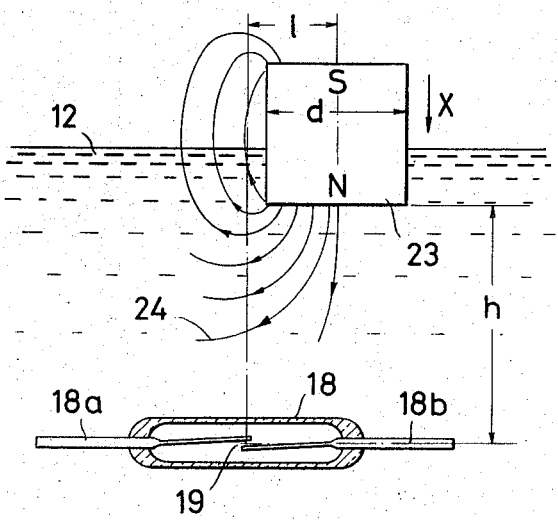
FIGS. 2A and 2B are diagrammatic illustrations respectively illustrating the relationship between a permanent magnet and a reed switch employed in the device for explaining the operation principle of the device.
Figure 2B:
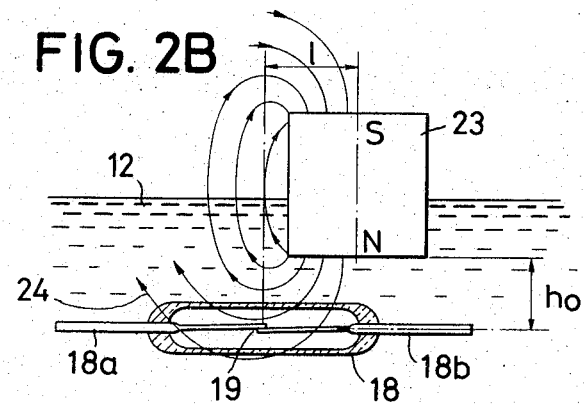

As the liquid level of the oil 12 gradually decreases and has reached the predetermined level to be detected as shown in FIG. 2B, the distance $h$ reaches a predetermined critical distance $h_o$. At this time, a horizontal component of the loop of the magnetic flux 24 flowing from the north pole (N) to the south pole (S) of the permanent magnet 23 acts on the reeds 18a and 18b of the reed switch 18 mainly in the longitudinal direction thereof. Hence, the reeds 18a and 18b are magnetized by the lines of magnetic flux and tend to attract each other. This attractive force overcomes the resilient force of the reeds and the reeds 18a and 18b make contact with each other thereby closing the reed switch 18.

As the reed switch 18 is closed, an alarm device such as a lamp connected to the lead wires 20 and 21 is actuated to indicate that the liquid level has reached the dangerously decreased level.

The critical liquid level $h_o$ at which the reed switch 18 is closed can be selected at a desired level by varying the position of the reed switch 18 in the blind hole 17 and thereby varying the offset distance $l$ of the contact portions 19 of the reed switch 18 from the axis of the permanent magnet 23 buried in the middle portion of the float 22. The critical liquid level $h_o$ can also be selected at a desired level by selecting the diameter $d$ of the permanent magnet 23, the strength of the magnetic force etc. It should be noted, however, that if the distance $l$ is selected at a value less than $d/2$, namely if the contact portions 19 of the reed switch 18 are placed beneath the circular bottom surface of the permanent magnet 23, the lines of magnetic flux pass through the reeds 18a and 18b only in a vertical direction even when the permanent magnet 25 drops to a point at which it abuts against the reed switch 18 and, therefore, the reed switch 18 does not operate in this state.

In the embodiment shown in FIGS. 2A and 2B, the permanent magnet 23 is shown as having its S pole on the upper side and its N pole on the lower side. It will be apparent that the positions of these poles may be reversed, namely the S pole on the lower side and the N pole on the upper side. Since the device according to the invention has the N and S poles of the permanent magnet disposed in a vertical relationship, the permanent magnet 23 acts on the reed switch 18 always under the same condition, no matter what position the float 22 and the permanent magnet 23 may take in a horizontal plane in the state wherein they are floating on the oil 12.

Figure 3:
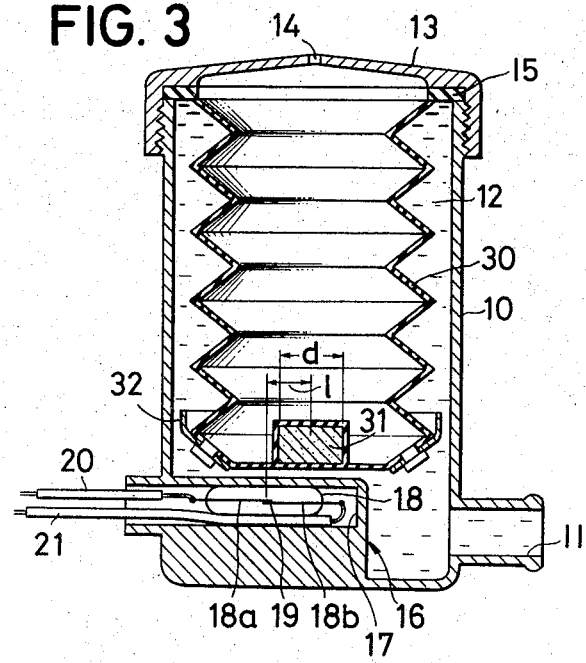
FIG. 3 is a vertical sectional view showing a second embodiment of the device for detecting decrease of liquid according to the invention.

Next to be described with reference to FIG. 3 is the second embodiment of the device for detecting decrease of liquid according to the invention. In FIG. 3, the same component parts as shown in FIG. 1 are designated by the same reference numerals and a detailed description thereof is omitted.

Generally speaking, oil should preferably be isolated from the outside air to prevent mixing of water or other undesirous materials as well as to preclude deterioration due to oxidation. Hence, the present embodiment incorporates a device for isolating the oil 12 from the outside air.

Bellows 30 is secured at the upper end thereof to the inner circumferential surface of an annular packing 15 in watertight and airtight manner. The bellows 30 is so constructed that it stretches downwardly as the oil 12 in the reservoir 10 decreases. A permanent magnet 31 having its poles vertically disposed is secured to the inside bottom surface of the bellows 30.

A guide plate 32 is fixedly attached to the lower bottom surface of the bellows 30. The guide plate 32 serves for guiding the downward movement of the bellows 30 so as to keep the axis of the permanent magnet 31 aligned with the axis of the reservoir 10 when the bellows 30 stretches and the bottom portion thereof moves downwardly. The outer peripheral edge portion of the guide plate 32 is bent upwardly and the outer diameter thereof is slightly smaller than the inner diameter of the reservoir 10. The guide plate 32 also serves to prevent a transverse swinging motion of the bellows 30 due to vibrations, impacts etc.

When the reservoir 10 is filled with oil 12, the bellows 30 is in a contracted state with the bottom portion thereof high above reed switch 18. Accordingly, the magnetic force of the permanent magnet 31 acting on the reed switch 18 is very weak and the reed switch 18 is opened.

As the oil 12 in the reservoir 10 decreases, the bellows 30 stretches to fill the space made by the decrease of the oil, the bottom portion of the bellows moving downwardly. At this time, air is sucked into the bellows 30 in an amount which fills the space formed by stretching of the bellows 30.

As the bellows 30 stretches due to the decrease of the oil 12 and the permanent magnet 31 secured to the bottom of the bellows 30 reaches the critical liquid level $h_o$, the magnetic force of the permanent magnet 31 acts on the reed switch 18 to close the same. This actuates an alarm device connected to the reed switch 18 to give a necessary alarm.

According to the embodiment of FIG. 3, the space enclosed by the outer circumferential surface of the bellows 30 and the inner circumferential surface of the reservoir 10 is always filled with the oil 12 and, accordingly, the oil 12 is completely isolated from air. Thus, the problems of deterioration of the oil and mixing of undesirous materials are completely overcome. Moreover, since the oil 12 is enclosed in the reservoir, the oil 12 is not likely to leak out of the reservoir 10 even in an event that a vehicle incorporating the device according to the invention is inclined or overturned.

In the second embodiment described above, if use of the oil is continued after giving of the alarm and the oil 12 further decreases, the lower surface of the guide plate 32 attached to the lower surface of the bellows 30 abuts against the upper surface of the shoulder portion 16 thereby stopping further downward movement of the bottom portion of the bellows 30. In this case, the bellows 30 has to swell in a diametrical direction. This gives rise to a problem that the bellows 30 tends to be damaged. There is a further a problem in this embodiment that the sealed portion of the bellows 30 is under a vacuum pressure due to decrease of the oil resulting in shortening of the life of the sealed portion.

Figure 4:
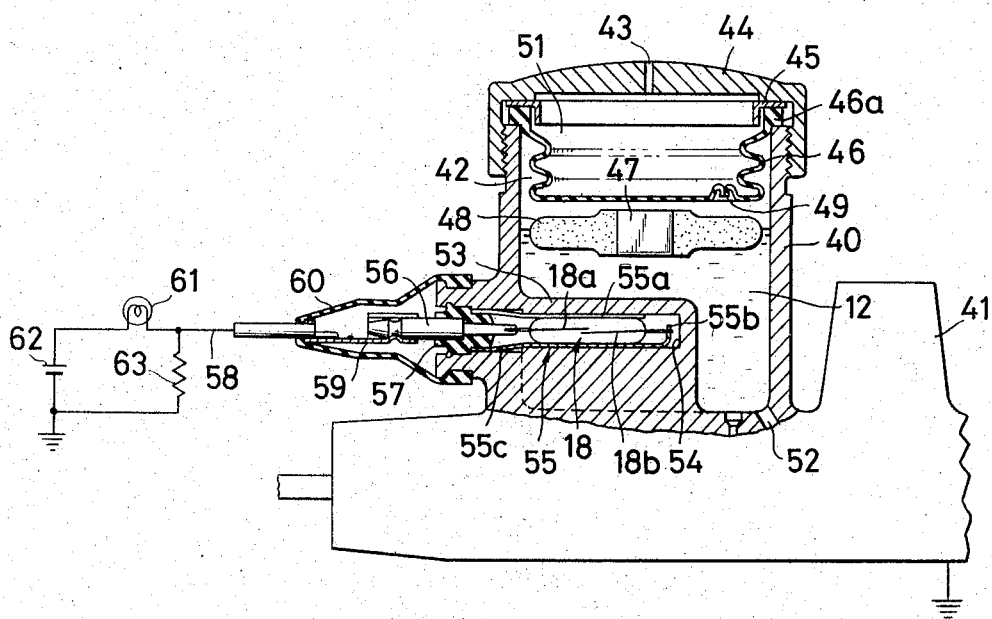
FIG. 4 is a vertical sectional view showing a third embodiment of the device according to the invention.

FIG. 4 shows the third embodiment of the device according to the invention. An oil reservoir 40 is formed integrally with a master cylinder 41, the reservoir being made of electrically conductive material and is grounded to the chassis. The reservoir 40 contains oil 12 with a space 42 left above the surface of the oil 12. A cap 44 having an air vent 43 in the middle portion thereof is screwed on the upper circumferential surface of the reservoir 40. As the cap 44 is tightly screwed on the reservoir 40, the upper end portion 46a of bellows 40 is held tightly between the cap 44 and the reservoir 40 through an intermediate member 45. A float 48 which carries a permanent magnet 47 having its poles vertically disposed floats on the oil 12.

Figure 5:
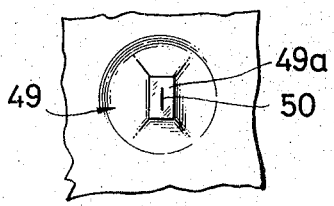
FIG. 5 is a bottom plan view of a one-way valve provided on the diaphragm of the device shown in FIG. 4.

The bellows 46 is shorter in axial length than the bellows 30 shown in FIG. 3, and is of such a length that is sufficient to enable the upper surfaces of the permanent magnet 47 and float 48 to contact the lower surface of the bellows 46 when a predetermined quantity of oil 12 is filled in the reservoir 40. The bellows 46 is provided at the bottom thereof with a one-way valve (check valve) 49 the bottom surface of which is shown in FIG. 5. The one-way valve 49 comprises a bill-like portion 49a and a slit 50. The foremost end of the bill-like portion 49a is located above the lower surface of the bellows 46 so that the lower end of the bill-like portion 49a does not engage the float 48 when the float 48 abuts against the lower surface of the bellows 46.

The operation of the one-way valve 49 is such that when differential pressure between the atmosphere in the space 51 of the bellows 46 and the air in the space 42 of the reservoir 40 exceeds a predetermined value, the valve 49 allows air to flow from the space 51 to the space 42, whereas it prevents air from flowing from the space 42 to the space 51.

The inside of the reservoir 40 communicates with a master cylinder within the master cylinder body 41. A shoulder portion 53 is provided on the bottom of the reservoir 40, which shoulder portion is formed with a horizontal blind hole 54.

Figure 6A:
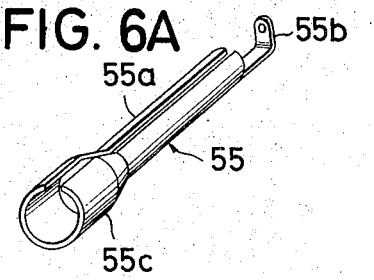
FIGS. 6A and 6B are perspective views showing respective members for mounting a reed switch thereon.

The reed switch 18 is inserted in and held by a reed switch mounting socket 55 as shown in the perspective view of FIG. 6A. The socket 55 is made of a conductive, non-magnetic metal plate and comprises a reed switch receiving portion 55a having a substantially cylindrical configuration, a tongue portion 55b to which the end of the reed 18b of the reed switch 18 is electrically connected and fitting portion 55c. The end of the reed 18a of the reed switch 18 is electrically connected to one end of a terminal 56. An insulating member 57 which holds the terminal 56 is fitted at the end portion thereof in the fitting portion 55c of the socket 55. In the state as described hereinabove wherein the socket 55 carrying the reed switch 18 is inserted in the blind hole 54, the insulating member 57 is held adjacent the open end of the blind hole 54 and the fitting portion 55c engages the inner circumferential surface of the blind hole 54 in the vicinity of the open end portion thereof. Accordingly, the reed 18b of the reed switch 18 is grounded via the socket 55, the reservoir 40 and the master cylinder 41.

Figure 6B:
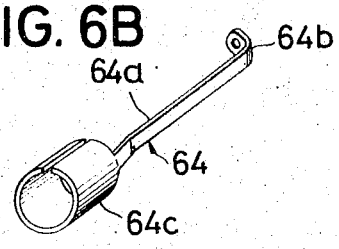

Instead of the socket 55, there may be used a socket 64 as shown in FIG. 6B which comprises a reed switch protecting portion 64a having a flat, elongated configuration, a tongue portion 64b and a fitting portion 64c.

The other end of the terminal 53 is fitted in a tubular terminal 59 which is electrically connected to a wire 58. The terminals 53 and 59 are covered by an insulating cap 60. An alarm lamp 61 is connected at one terminal to the wire 58 and to a positive pole of a battery 62 at its other terminal. The lamp 61 is connected also to a negative pole (ground side) of the battery 62 through a resistor 63.

In the present embodiment, the reed 18b of the reed switch 18 is grounded through the socket 55 and the master cylinder 41. Accordingly, only the single wire 58 is led from the reed switch 18.

If an optimum quantity of oil 12 is stored in the reservoir 40, the permanent magnet 47 is spaced from the reed switch 18 by more than a critical distance and, accordingly, the reed switch 18 is open. Even while the reed switch 18 is open, a very small current which is not sufficient to light the lamp 61 is flowing therethrough since the lamp 61 always makes a closed circuit with the battery 62 through the resistor 63. Hence, assuming that the voltage of the battery 62 is 12V and the value of resistance of the resistor 63 is 220–250Ω, the lamp 61 whose resistance is of the order of 4Ω during non-conduction is slightly heated by conduction through the resistor 63 and its value of resistance rises to approximately 20Ω.

Since constant conduction and resulting maintenance of a high resistance value of the lamp 61 is required for preventing the contact portions of the reeds 18a and 18b from fusing together by a flow of a large rush current at the closing of the reed switch 18 because the value of resistance of the lamp 61 is about 40Ω when it is lighted under a normal lighting condition but it has a very low value of only about 40Ω at the time of non-conduction.

If the oil 12 gradually decreases, the bellows 46 stretches to some extent and, when a differential pressure exeeding a predetermined value is generated between the space 42 and the space 51, air in the space 51 flows into the space 42 through the one-way valve 49 by an amount equivalent to the decrease of the oil 12. The float 48 and the permanent magnet 47 descend as the oil 12 decreases.

When the master cylinder is in operation, the oil 12 flows into and out of the reservoir 40 through a passage 52 resulting in a slight fluctuation in the level of the oil 12. The variation of the internal pressure in the space 42 caused by this liquid fluctuation is absorbed by expansion and contraction of the bellows 46.

As the oil 12 in the reservoir 40 further decreases, supply of air from the space 51 to the space 42 through the one-way valve 49 is repeated. When the level of the oil 12 has reached a predetermined critical level, the magnetic force of the permanent magnet 47 acts on the reed switch 18 to close the same. The closing of the reed switch 18 causes the resistor 63 to be short-circuited and the lamp 61 alone forms a closed circuit with the battery 62. Accordingly, the lamp 61 is lighted thereby indicating the decrease of the oil 12. As described above, a preliminary current has passed through the lamp 61 thereby increasing the value of resistance. Hence, no large rush current flows through the reed switch 18 when the lamp 61 is lighted.

The invention is not limited to the disclosed embodiments and various variations and modifications may be made without departing from the scope and spirit of the invention as defined in the appended claims.

What I claim is:

1. A device for detecting decrease of liquid comprising: a liquid reservoir storing liquid therein, said liquid reservoir having a lower bottom surface and including a shoulder portion projecting from said lower bottom surface, said shoulder portion being provided in the vicinity of the upper surface thereof with a blind hole extending substantially horizontally in the shoulder portion; a conduit disposed in proximity to the lower bottom surface of the liquid reservoir, said conduit being at a level lower than the blind hole and communicating with the interior of the liquid reservoir; float means movable upwardly and downwardly with change of quantity of the liquid in the reservoir; a permanent magnet centrally secured in said float means and having magnetic poles disposed vertically, said permanent magnet being of a columnar configuration; a normally open reed switch disposed in said blind hole in the shoulder portion of the liquid reservoir, said reed switch including reeds with contact portions disposed at a position transversely offset from the axis of the permanent magnet by a distance at least equal to the radius of the permanent magnet; said reed switch being closed by a horizontal component of magnetic flux from the permanent magnet when the liquid decreases below a predetermined level and said permanent magnet with said float means has reached a position of a predetermined spacing from the reed switch; and means coupled to said reed switch for producing an output signal upon closing of the reed switch.

2. A device for detecting decrease of liquid as claimed in claim 1 in which said liquid reservoir is substantially of a cylindrical configuration, said float means comprising a float floating on the liquid, said float being in the form of a disc having an outer diameter which is slightly smaller than the inner diameter of said reservoir, said permanent magnet being centrally buried in said disc.

3. A device for detecting decrease of liquid as claimed in claim 1 in which said float means comprises a bellows which encloses the liquid between the outer surface thereof and the inner surface of the liquid reservoir and stretches as the liquid decreases, and a guide plate fixedly attached to the bellows at the lower bottom surface thereof and having an outer diameter slightly smaller than the inner diameter of the liquid reservoir, said permanent magnet being secured at the center of the bottom surface of said bellows.

4. A device for detecting decrease of liquid as claimed in claim 1 further comprising a bellows dividing the space above the liquid surface in said reservoir into two parts, said bellows including at the bottom thereof a one-way valve which permits air to flow only from a first space in said bellows to a second space defined between said bellows and the liquid surface.

5. A device for detecting decrease of liquid as claimed in claim 1 in which said means for producing an output signal comprises an alarm means actuated by being connected to a power source through the closed reed switch, said liquid reservoir being made of a conductive material and electrically connected to the negative pole of the power source, and a socket made of a conductive and non-magnetic material holding the reed switch therein, said socket being electrically connected to one reed of the reed switch and to the liquid reservoir by contact with the inner surface of the blind hole in an inserted state in the blind hole, the other reed of said reed switch being electrically connected to said alarm means by means of a single wire.

* * * * *